Sept. 9, 1924.

W. WOOLCOTT

AUTOMATIC WEIGHING MACHINE

Filed July 31, 1920

Inventor:
William Woolcott.
By Elliott & Ammen
Atty's.

Sept. 9, 1924.  
W. WOOLCOTT  
AUTOMATIC WEIGHING MACHINE  
Filed July 31, 1920   8 Sheets-Sheet 5

1,507,650

Inventor:  
William Woolcott  
By Elliott Manus  
Atty's.

Sept. 9, 1924.
W. WOOLCOTT
1,507,650
AUTOMATIC WEIGHING MACHINE
Filed July 31, 1920
8 Sheets-Sheet 6
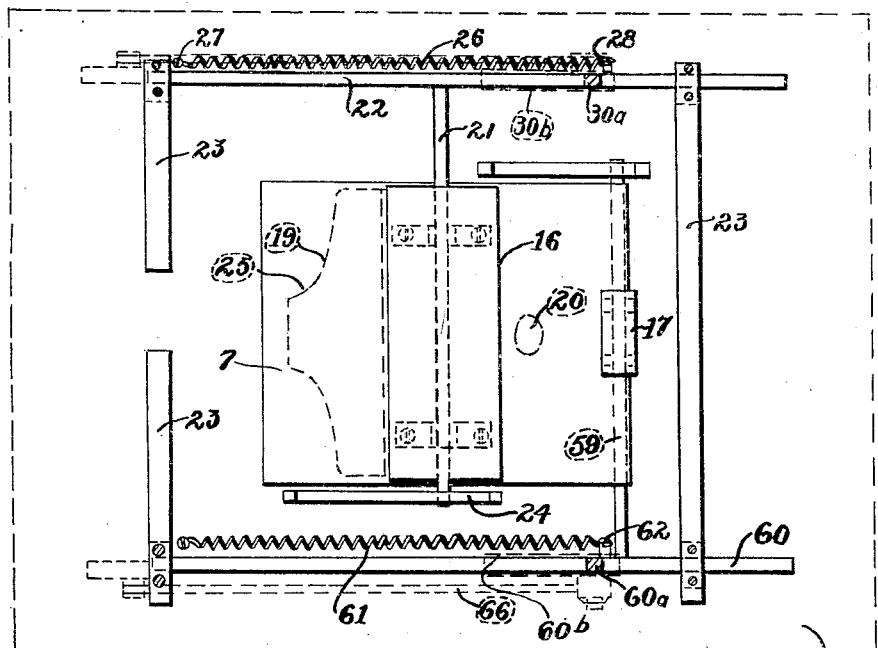
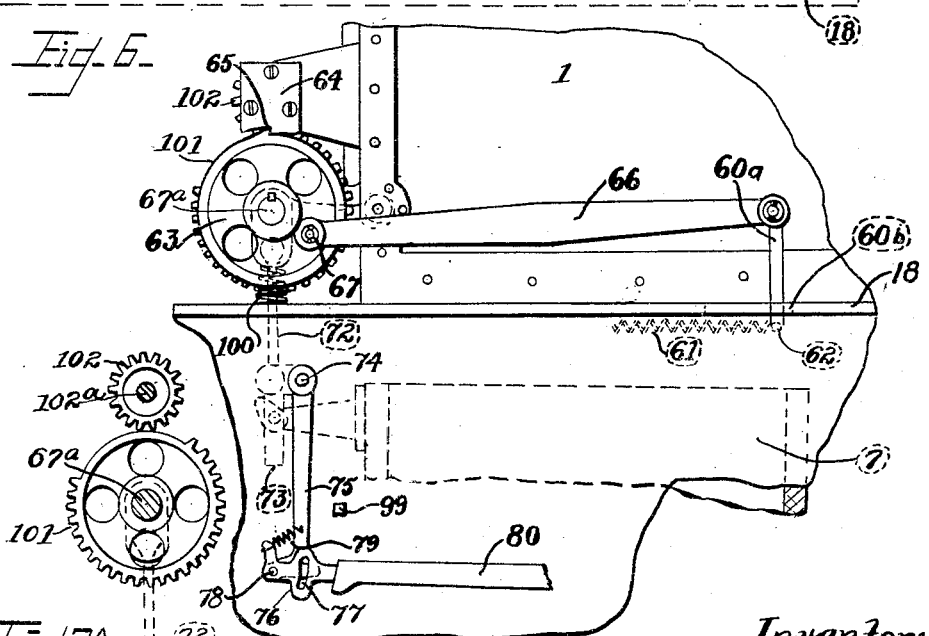
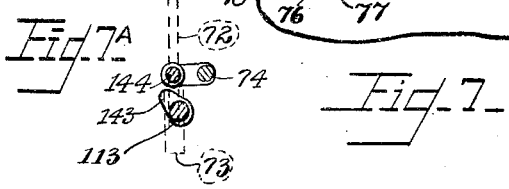
Inventor:
William Woolcott
By Elliott & Ammen
Attys.

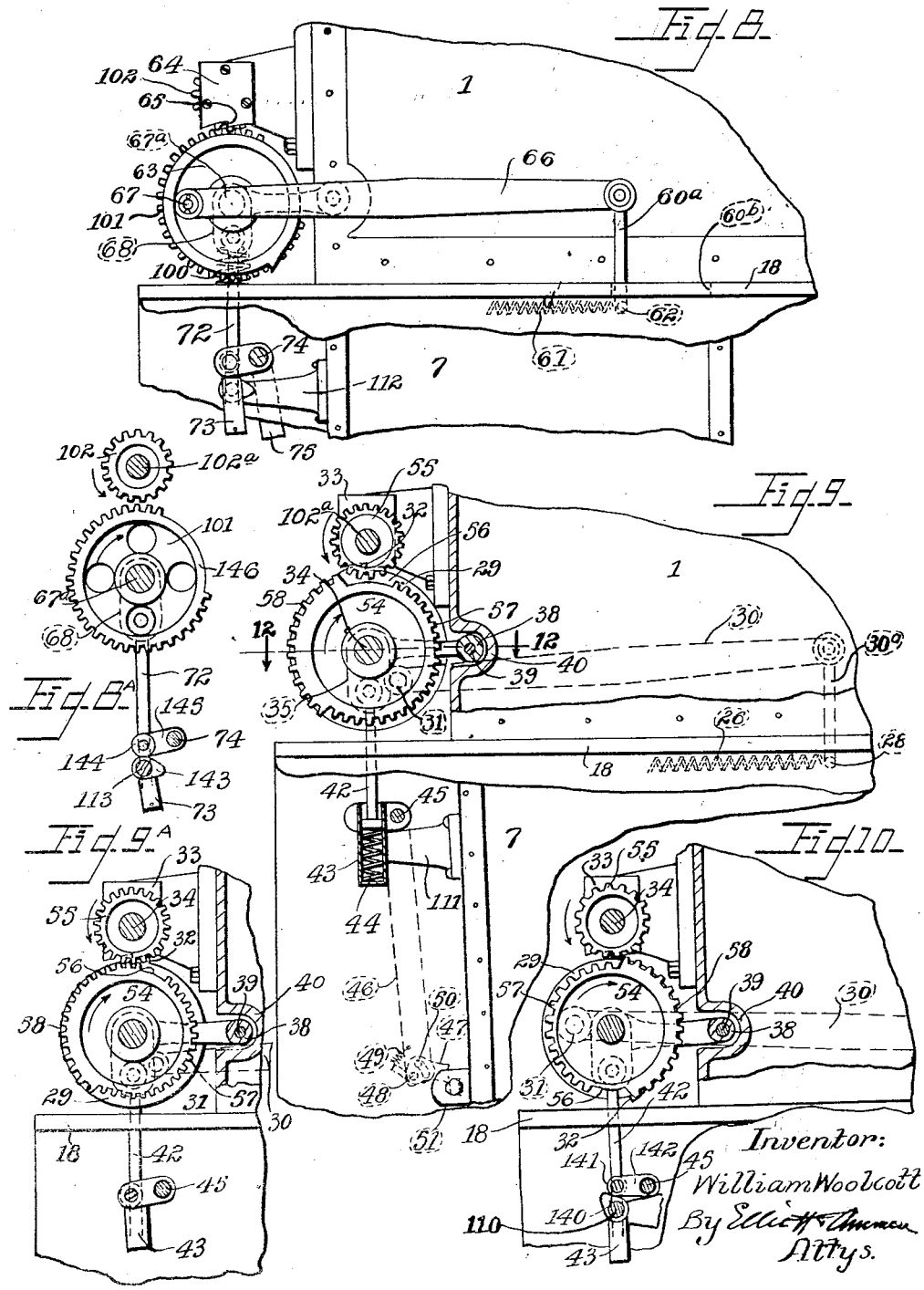

Sept. 9, 1924.  W. WOOLCOTT  1,507,650
AUTOMATIC WEIGHING MACHINE
Filed July 31, 1920  8 Sheets-Sheet 8
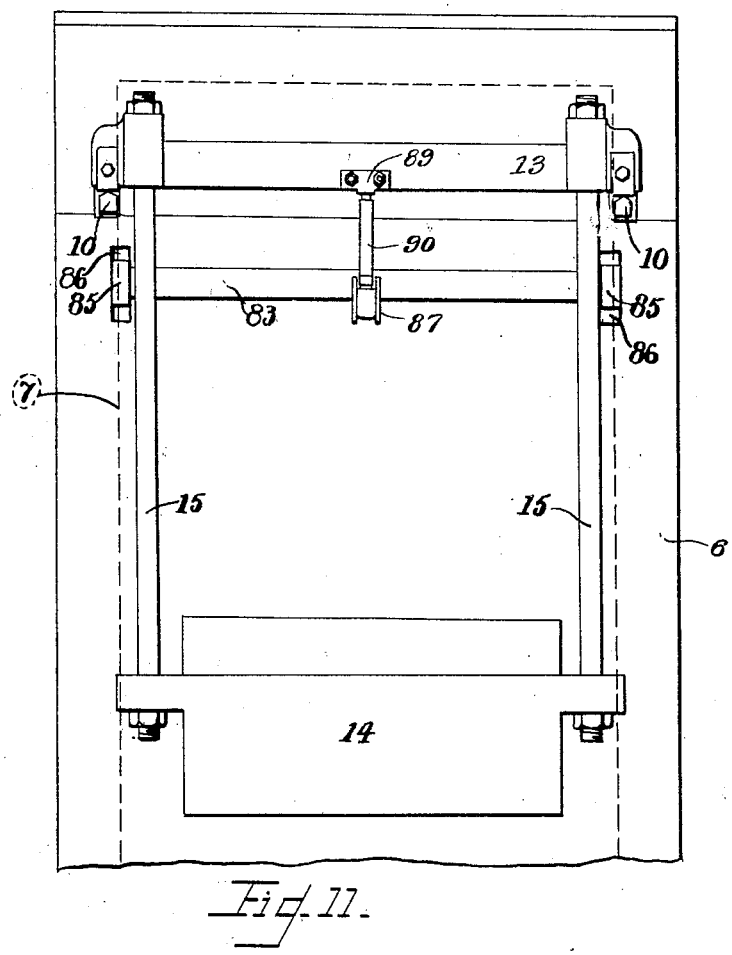
Fig. 11.
Fig. 12.
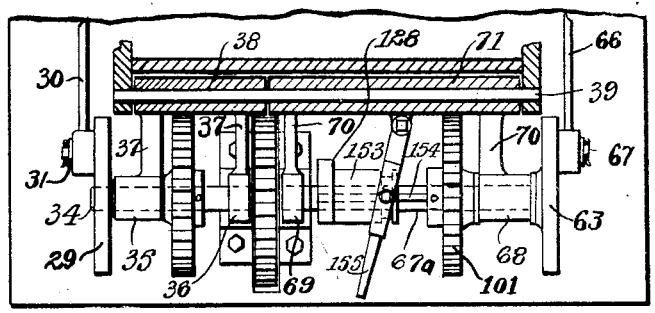
Inventor:
William Woolcott
By Elliott Numer
Att'ys.

Patented Sept. 9, 1924.

1,507,650

UNITED STATES PATENT OFFICE.

WILLIAM WOOLCOTT, OF WINCHESTER, KENTUCKY.

AUTOMATIC WEIGHING MACHINE.

Application filed July 31, 1920. Serial No. 400,449.

*To all whom it may concern:*

Be it known that I, WILLIAM WOOLCOTT, a citizen of the United States, residing in the city of Winchester and State of Kentucky, have invented new and useful Improvements in Automatic Weighing Machines, of which the following is a specification.

This invention relates to automatic weighing machines. In a common type of this machine, the force which affects the working parts is furnished by the weight of the material to be weighed. This mode of operation renders the weight slightly inaccurate and uncertain on account of insufficient force to overcome the friction of the working parts.

The principal object of the present invention is to overcome this objection and to provide means for effecting the automatic dumping of the weighing hopper and the other automatic movements that are necessary to the continuous operation of the machine without relying upon the weight of the material in the hopper except to control the time or order of operation of the different automatic mechanisms. In order to accomplish this I provide a power-driven member or members which are automatically connected operatively to the automatic actuating mechanisms that control the flow of the material to the weighing hopper, that regulate and close off the stream of material through the operation of the gage means, effect the closing of the gate means at a predetermined point, reopen the gate means, effect the dumping of the weighing hopper, and reset the tripping mechanism or mechanisms which control the automatic operations. One of the objects of the invention is to provide simple means for supplying a relatively large stream of material to the hopper until the hopper is substantially loaded to the limit of the weight to which it is set for weighing, and when this point is reached the stream is reduced automatically so as to leave a relatively small stream of the material still flowing to the hopper, means being provided for closing off this small stream promptly when a predetermined weight has accumulated in the weighing hopper. One of my objects has been to provide a tripping mechanism for closing off this relatively small stream which is so constructed that it operates without any substantial resistance, thereby securing accuracy in the measurement of the weight. Another object of the invention is to provide simple means for effecting the gradual shutting off of the relatively large stream. Another object of the invention is to provide means for insuring a high velocity of delivery of the material being weighed, to the hopper.

Although I do not limit myself in any way to the use of the machine for weighing any particular kind of material, in the following specification I have described the invention as applied to a machine for weighing flour, feed or any other finely divided material.

Further objects of the invention will appear hereinafter.

The invention consists in the novel features, and in the general combination of parts to be particularly described hereinafter, all of which contribute to produce a simple and efficient automatic weighing machine. A preferred embodiment of my invention will be particularly described in the following specification, while the broad scope of my invention will be pointed out in the appended claims.

In the drawing,

Figure 1 is a side elevation of a machine embodying my invention; this view shows parts of the tripping mechanism in their set position, that is to say, in the relation which they have when the weighing hopper is receiving material to be weighed;

Figure 1ª is a side elevation showing the parts of the tripping mechanism after being tripped or sprung by the automatic operation of the machine;

Figure 1ᵇ is a plan showing a portion of the scale mechanism, that carries the adjustable pea that assists in determining the weight at which the gate means will be controlled;

Figure 6 is a horizontal section taken on the line 6—6 of Figure 5, and particularly illustrates the gate means;

Figure 7 is a fragmentary side elevation particularly illustrating the gate mechanism which effects the shutting off of the relatively small stream of material, and illustrating how the tripping mechanism operates to prevent the final closing of the gate until a predetermined weight has accumulated in the hopper;

Figure 4:
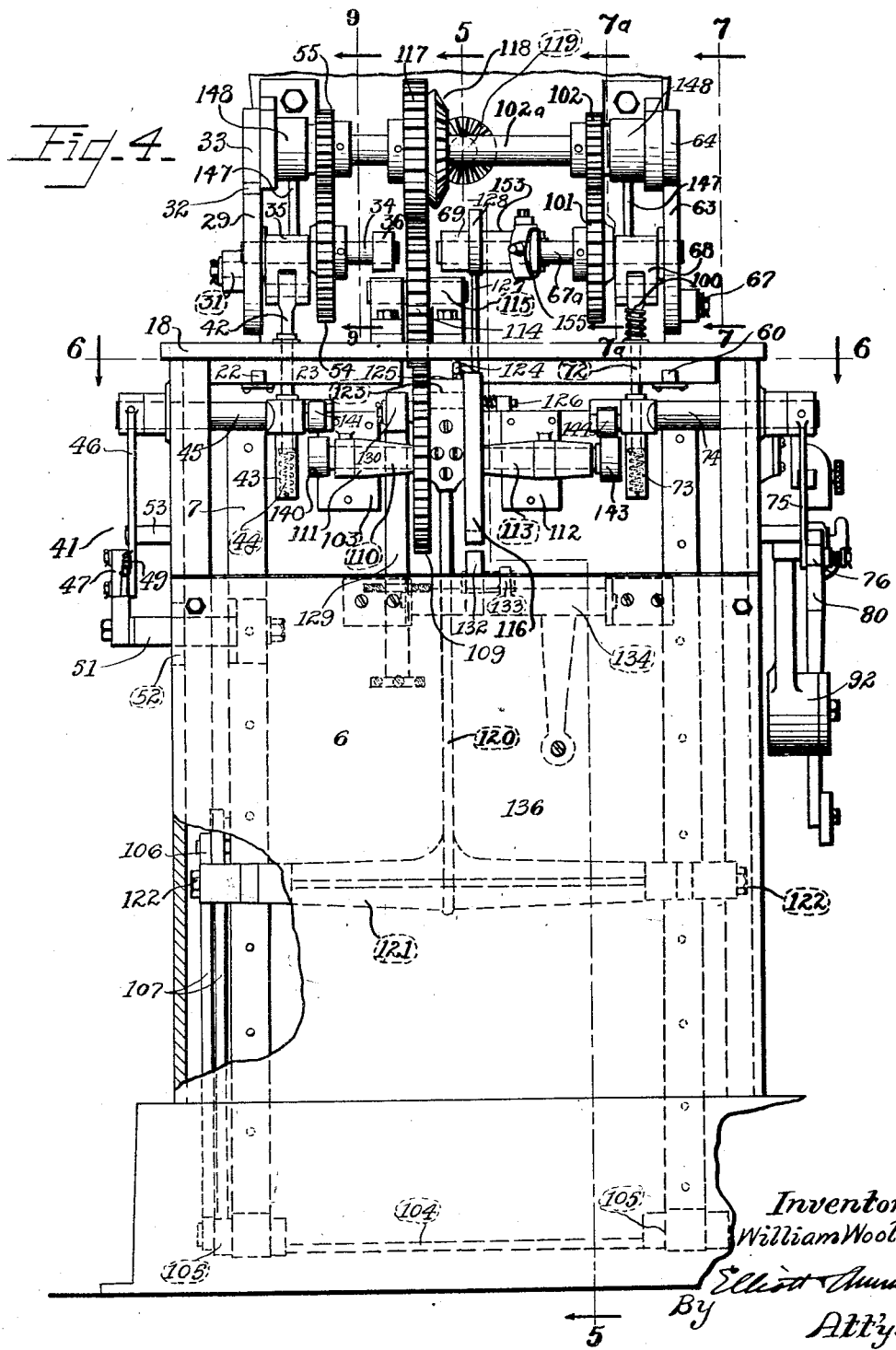
Figure 4 is a front elevation of the machine with the covers of the mechanism removed and the upper portion of the machine broken away; the lower part of the machine is also broken away to further illustrate details of the construction.
Figure 5:
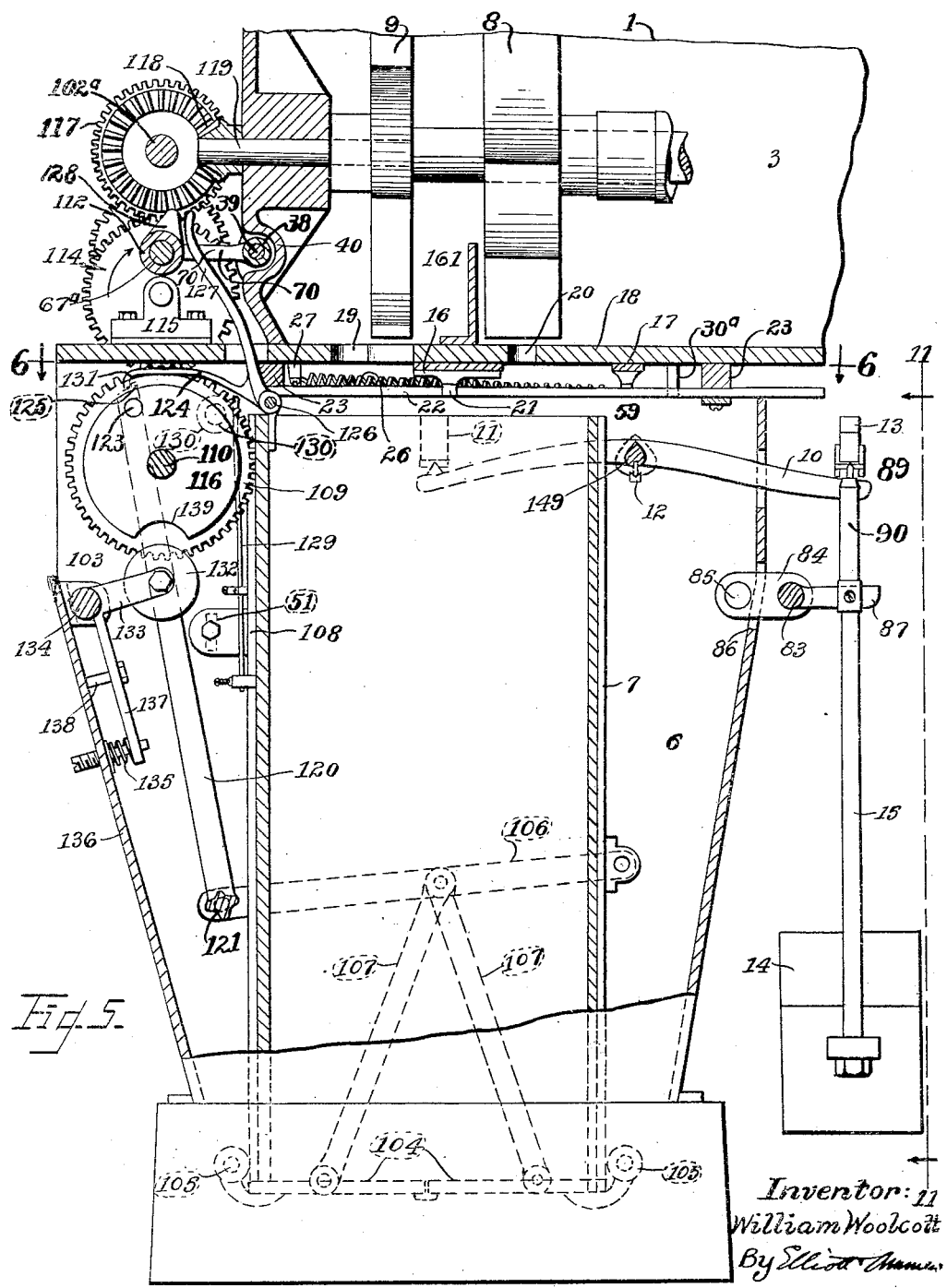
Figure 5 is a longitudinal vertical section upon an enlarged scale taken through the weighing hopper and the upper portion of the casing which surrounds the weighing hoppers, and partly illustrating the dumping mechanism and the arrangement of the parts of the weighing scale; this section is taken about on the line 5—5 of Figure 4.

Figure 7ª is a vertical section showing in detail the relation of parts of the mechanism corresponding to the relation of the parts shown in Figure 7; this section is taken about on the line 7ª—7ª of Figure 4;

Figure 8 is a side elevation showing some of the parts illustrated in Figure 6, but in the relation they assume after the tripping mechanism has been actuated, that is to say, this view shows the parts in the relation they assume when the gate is completely closed;

Figure 8ª is a vertical section showing details of parts co-operating with the parts shown in Figure 8, showing their relation corresponding to the relation shown in Figure 8; this view is taken on the line 7ª—7ª of Figure 4;

Figure 9 is a vertical section through the machine taken on the line 9—9 of Fig. 4, certain parts being shown in elevation; this view shows the gate mechanism that controls the shutting off of the main stream or relatively large stream and shows their relation when the gate is wide open;

Figure 9ª is a vertical section at the same point, but showing the relation of the parts immediately after the tripping mechanism has been actuated, that is to say, it shows the parts in a position corresponding to the beginning of the closing movement of the main gate;

Figure 10 is a view similar to Figure 9 but showing the relation of the parts when the gate is closed;

Figure 11 is a rear elevation of the machine as viewed from the location of the line 11—11 in Figure 5;

Figure 12 is a horizontal section taken on the line 12—12 of Figure 9.

Before proceeding to a description of this machine, it will facilitate the disclosure of the invention to say that I provide a weighing hopper which is supported in any suitable manner on the beam of a weighing scale, and I provide gate means for controlling the flow of the material to the hopper. Gate closing means is also provided, the time of operation of which is controlled by the tripping mechanism, but the force which effects the actual shutting off of the stream of material, receives its energy from a source extraneous to the weight of the hopper and material in it, in other words, the closing of the gate means is effected by an independent force, and I simply utilize the movement of the hopper as it descends under the weight of the load, to actuate the tripping mechanism. Although I do not limit myself to the particular type or organization of tripping mechanism described herein, I prefer to divide the tripping mechanism into two mechanisms, the first of which is mounted so that it will be tripped or actuated by means of the hopper or carried by the hopper, and the operation of this mechanism shuts off the relatively large stream of material flowing to the hopper, leaving however, a relatively small stream still flowing. When the weight in the hopper reaches a predetermined amount the second division of the tripping mechanism is released or actuated by a movement which I prefer to take from the scale beam or a part actuated by the scale beam. Associated with this second mechanism I provide means for setting it very accurately to trip at a predetermined point; the tripping of this mechanism immediately effects the shutting off of the relatively small stream and the dumping of the hopper is then automatically effected by the dumping mechanism. In order to give the machine a high velocity, that is to say, in order to enable it to weigh the material at a very rapid rate, I provide means for impelling the streams of material to the hopper at a high velocity, that is to say, I do not depend upon gravity for filling the hopper. In weighing some materials this feature of the mechanism might be unnecessary but in materials having the nature of flour, it is desirable to provide artificial means for increasing the velocity of the flow of the stream in order to give the machine speed in its weighing operations.

In order to accomplish these effects, I provide a receiver 1 (see Fig. 1) which may be divided on its interior into two compartments 2 and 3 (see Fig. 3) and over the latter compartment a supply hopper 4 is provided through which the material to be weighed gravitates into the compartment 2. Suitable mechanical means such as a large feed screw 5 (see Fig. 3) is provided, the rotation of which advances the material into the compartment 3. Below the compartment 3 a casing 6 is provided, within which a weighing hopper 7 is mounted. Within the compartment 3 I provide impelling devices which may be in the form of rotary beaters or accelerators 8 and 9, the function of which is to develop a high velocity in the stream or streams flowing into the weighing hopper from the supply compartment. I shall describe hereinafter, more in detail the means for driving the feed screw 5 and the beaters 8 and 9.

The weighing hopper 7 is supported on each side by a scale lever 10 and these scale levers 10 constitute the beam of the weighing scale; the inner end of each lever 10 engages under a lug 11 on each side of the weighing hopper (see Fig. 5), each lever being supported on a knife edge 12 and extending through an opening in the back wall of the casing 6; on the exposed ends of the levers 10 a cross bar 13 is supported on knife edges and from this bar a heavy counterweight 14 is suspended on stems 15 (see Figs. 5 and 11).

The flow of the stream of material from the compartment 3 to the weighing hopper is controlled by suitable gate-means operating in such a way that when actuated it effects the partial closing off of the flow of material first, and later effects a final shutting off of the material. I prefer to construct this gate means so that it comprises a main gate 16 and an auxiliary or dribble gate 17; these gates operate as slides on the underside of the bottom 18 of the compartment 3; the gate 16 controls the flow through a main opening 19 and the gate 17 controls the flow through an auxiliary or dribble opening 20.

The gate controlling mechanism or gate actuating mechanism co-operates with the gate in such a way that it effects a partial shutting off or reduction of the large stream and then later effects the complete closing or shutting off of the remaining small stream. As applied to gate-means having the detail construction described above, I provide gate mechanism corresponding to the main gate 16 and other gate mechanism corresponding to the auxiliary gate 17.

I shall now proceed to describe the gate mechanism which controls the closing of the main gate, referring especially to Figure 6 (see Figure 5 also). In this view the openings 19 and 20 are indicated in dotted lines simply to show their relation. The gates are indicated in this way, because as a matter of fact, they are above the line 6—6 of Figure 5 on which this section is taken, it being understood that Figure 6 represents the parts in plan as viewed from above. The main gate 16 is in the form of a rectangular plate lying against the underface of the bottom 18 and it is carried upon a cross bar 21 which extends transversely from a slide bar 22, the said slide bar being guided to slide longitudinally on cleats 23 which are attached to the underside of the bottom. The unattached end of the cross bar 21 is guided along the underside of the bottom 18 by a suitable guide cleat or guide bar 24. I prefer to give the main opening 19 substantially the form shown, that is to say, I shape it so that the opening has a reduced extension 25 projecting in the direction in which the gate closes; the effect of this is to bring about a gradual closing or shutting off of the stream that is passing through this opening. This tends to bring about a smooth operation of the mechanism, and tends to prevent a jar when the gate becomes fully closed.

Any force independent of the hopper weight may be provided for effecting the closing of this gate. I prefer however, to control the gate in such a way that it is held open by tripping mechanism including detent means until the hopper has descended under the weight of its load to a predetermined point. At this point the tripping mechanism will be tripped and the closing movement of the gate will be initiated. In the present instance the closing means for the gate is preferably in the form of a coil spring 26 (see Fig. 6) which extends longitudinally with the slide bar 22, the forward end of the spring being fixed to the bottom 18 at the point 27 (see Fig. 5), and the rear end of the spring being attached at 28 to the side of the slide bar (see Fig. 6).

Figure 2:
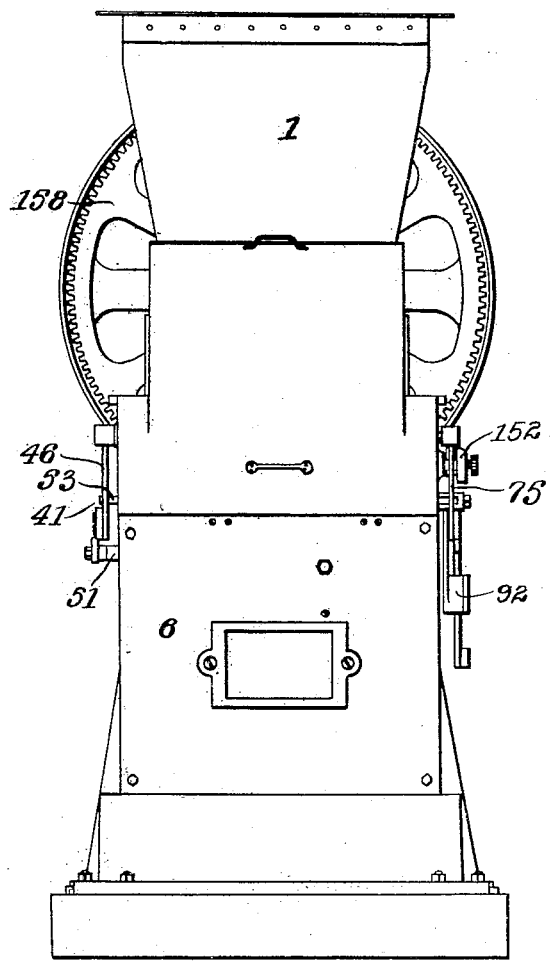
Figure 2 is a front elevation of the machine.

I shall now describe the tripping mechanism including the detent means for effecting the closing of the gate. On account of the location of this tripping mechanism which is at the left side of the machine, as viewed in Figure 2, the details of the mechanism cannot be illustrated as readily as the details of the tripping mechanism which controls the closing of the auxiliary or dribble gate 17. This latter mechanism is illustrated in Figure 7. Both of these mechanisms include a detent wheel, the rotation of which is prevented by its corresponding tripping mechanism. The construction and mode of operation of the detent wheel in each case, is substantially the same and for this reason attention is now called to Figure 7. from which the reader will clearly observe the manner in which it is held against rotation.

I shall now refer to Figure 9 which shows the corresponding relation of the parts of the controlling mechanism for the main gate. This mechanism includes a detent wheel 29 (see Figs. 4 and 9), to the side of which a connecting rod 30 is attached by a pivotal connection or a crank pin 31; when the gate is in the open position this crank pin is disposed toward its right hand dead center as viewed in Figure 9. The end of this connecting rod is attached to a post 30ª on slide bar 22 projecting up through a slot 30ᵇ in plate 18. Now when the tripping mechanism releases the detent wheel, the gate closing means such as spring 26, operates to move the gate 16 toward its closing position. The tripping mechanism may co-operate with this detent wheel in any suitable manner to effect the desired result. However, I prefer to provide the detent wheel 29 with a small detent tooth 32 (see Fig. 9), and this detent tooth engages fixed detent means which may be in the form of a plate 33 having a tooth similar to the tooth 32, which will engage with the tooth 32 and prevent the rotation of the detent wheel. I prefer to mount the wheel 29 so that it can be shifted away from the fixed detent means, thereby effecting its release from the detent means 33 in order to permit the initiation of the closing movement of the gate. In order to accomplish this, the detent wheel 29 is preferably carried rigidly on a short shaft 34 (see Fig. 4) and the bearings 35 and 36 for this shaft are carried respectively on the ends of two arms 37 (see Fig. 12). These arms are integral with a sleeve 38 which is loosely mounted on a cross pin or shaft 39 extending across the machine and carried in a recess or channel 40 formed in the forward wall of the compartment 3 (see Fig. 5). This shaft 34, when the machine is filling the hopper, is held elevated until it is time to close the main gate. It is held up through the operation of tripping mechanism 41 (see Figs. 3 and 4); for this purpose a lifting stem 42 (see Fig. 4) is pivotally attached to the underside of the bearing 35 and extends downwardly through the bottom plate 18, the lower end of said stem being received in the upper end of a spring barrel 43 (see Fig. 9) which carries a coil spring 44 which thrusts against an enlarged head formed at the lower end of the stem. This spring barrel is carried on a small rock shaft 45, to which a tripping lever 46 is rigidly attached, the lower end of the tripping lever carrying a pawl 47 which is capable of a limited swinging movement on its pivot 48. This pawl is pulled down by a small spiral spring 49 into the extreme low position that is permitted through the operation of a pin-and-slot connection 50 which connects the pawl to the lever or arm 46. When the large stream of material is flowing into the hopper 7, the end of this pawl is engaged by means, such as a lug 51 carried on the side of the hopper and projecting through a slot 52 in the side wall of the casing 6. Now, when the hopper descends to a predetermined point, the upper edge of the lug 51 will disengage itself from the pawl 47 and permit the arm or lever 47 to swing over against a fixed stop 53 (see Fig. 3). This movement of the arm will be caused by the weight of the detent wheel, its shaft 34 and other parts carried by it. As soon as the lever 46 is permitted to swing in this way, the detent wheel will drop down sufficiently to disengage its tooth 32 from the detent plate 33 and the spring 26 will then commence to close the gate and rotate the detent wheel 29 through the operation of the connecting rod 30; however, the gate closing means, such as the spring 26 is not permitted to close the gate suddenly but I provide means for retarding the closing movement so that the gate will close gradually. This means, which is about to be described, also affords means for effecting the reopening of the gate after the hopper has been automatically dumped. For this purpose I provide a gear wheel or detent gear wheel 54 (see Figs. 4, 9 and 9ª). This gear wheel is rigid with the detent wheel 29, that is to say, it is rigidly attached to the short shaft 34, and just above this gear wheel and in a position to mesh with it, I provide a continuously driven member or pinion 55. When the gate 16 is in its open position the lower edge of this pinion 55 is in a gap 56 formed in the teeth of the gear wheel 54 so that the rotation of the pinion 55 does not affect the gear wheel 54; at one side of this gap there is a sector of low teeth 57 and on the other side of the gap there is a series or sector of high teeth 58. Now, as soon as the spring 26 produces a partial rotation of the detent wheel and the gear wheel 54, these high teeth 58 come into mesh with the pinion 55 which is rotating in the direction of the arrow. This stage of the movement is shown in Figure 9ª. Now, although the spring 26 has exerted its force to close the gate, it cannot close it any faster than will be permitted by the rotating pinion 55. However, the closing movement of the gate progresses and eventually the pivotal connection at the crank pin 31 will arrive at the extreme, or outer dead center (see Fig. 10), at which time the high teeth 58 will have run out of mesh with the pinion 55 and this will leave the gate 16 standing in its closed position.

I shall now describe the tripping mechanism which effects the closing of the auxiliary gate 17, referring especially to Figures 6 and 7. This gate 17 is attached to a cross bar 59 which is similar to the cross bar 21 and guided in the same way. It extends transversely from a slide bar 60 which, like the slide bar 22 is guided to slide on the cleats 23. Likewise, gate closing means is provided operating upon this slide bar which may consist of a coil spring 61 which extends longitudinally with the slide bar 60 and is attached to it at 62. I provide a detent wheel 63 similar to the detent wheel 29, already described, and this detent wheel co-operates with detent means in the form of a detent plate 64 for which purpose the detent wheel is provided with a small tooth 65 adapted to engage with a corresponding tooth on the lower edge of the detent plate. A connecting rod 66 has a pivotal connection with a crank pin 67 on the outer side of this detent wheel, and the other end of the connecting rod is attached to a post 60ª extending up from the slide bar 60 and passing through a slot 60ᵇ in the bottom plate 18. The detent wheel 63 is carried on a short shaft 67ª (see Figs. 4 and 12) which shaft is rotatably mounted in bearings 68 and 69 which are carried on arms 70 which extend out from a sleeve 71, like the sleeve 38, and loosely mounted on the cross pin or shaft 39, (see Fig. 12). The movable parts of the tripping mechanism which control the dropping of the detent wheel 63 are very similar to the tripping mechanism 41, that is to say, the bearing 68 carries a lifting stem 72 (see Figs. 4 and 7), and the lower end of this stem is carried in a spring barrel 73 similar in construction to the spring barrel 43 and carrying a spring in the same way. This spring barrel is supported on a rock shaft 74 (see Fig. 7), from the outer end of which a trip lever or arm 75 extends downwardly, the lower end of the same being provided with a pawl 76 having a pin-and-slot connection 77 with the arm, permitting a limited movement about its pivot 78. This pawl is normally held in its extreme low position by a coil spring 79. This tripping lever 75 need not be tripped directly by the hopper nor by means carried by the hopper, but may be tripped through the agency of a part moved by the scale beam composed of the scale levers 10 (see Fig. 1). The part, however, for tripping this tripping mechanism is in the form of a special lever 80 (see Fig. 1) which is pivotally mounted at 81 on the side of the casing 6. The rear end 82 of this lever carries a cross bar 83 (see Fig. 5) which extends over to a short arm 84 which is pivotally attached at 85 to the other side of the casing 6. This short arm 84 passes through an opening 86 in the rear wall of the casing. Near the middle point of the cross bar 83 an arm 87 extends outwardly and this arm is disposed directly under the cross bar 13, already described. Near the middle point of the cross bar 13 a socket plate 89 is provided and from this socket plate a short strut 90 extends downwardly, the lower end of the strut being received on the short arm 87. From this arrangement it will be evident that as the weighing hopper 7 descends under the load, the bar 13 will rise and this will permit the arm 87 to rise. In this connection it should be understood that the lever 80 is of considerable length and extends horizontally toward the left so that it tends to swing downwardly by gravity. For this reason the weight of the hopper operates to hold the arm 87 up against the strut. However, in order to partially counterbalance the weight of the lever 80 so that it will tend to "float" in a substantially horizontal position, I provide the lever with a downward extension 91 (see Fig. 1). I also provide a small counterweight 92 which is pivoted at 93 and carries a rigid arm 94 with a roller 95 resting on the upper side of this lever near its extremity. This device operates as a damper to prevent a too free oscillation of this lever. At a suitable point on the balance lever 80 a short scale 96 is provided on which is mounted an adjustable pea 97. This small pea may be secured at any position on the scale and enables the weighing scale to be set accurately to trip the lever 75 at a predetermined weight in the weighing hopper. Now, when this predetermined weight is reached, the lever 80 will drop down toward a fixed stop 98 on the outer side of the casing and this will bring the end of the lever below the pawl 76 and thereby permit the lever 75 to swing over against a fixed stop 99 on the side of the casing; the detent wheel 63 then falls away from the detent plate 64 and the spring 61 closes the gate 17; this closing is effected at once by the spring 61 and is not retarded in any way by any mechanism. Figure 8 shows the detent wheel 63 in the position which it occupies while the dribble gate 17 is closed. If desired I may provide a small coil spring 100 around the stem 72 which cushions the dropping movement of the detent wheel 63 when it falls away from the fixed detent means 64.

As in the case of the detent wheel 29, the detent wheel 63 is provided with a gear wheel 101 which is rigid with it, that is to say, the gear wheel 101 is rigidly secured to the short shaft 67ª. Just above this gear wheel 101 I provide a continuously driven pinion 102 which is carried on a shaft 102ª which also carries the aforesaid pinion 55. By a mechanism which will be described later, the gear wheel 101 can be brought into mesh with the pinion 102 in such a way as to effect the reopening of the dribble gate 17. In like manner the gear wheel 54 may co-operate with its pinion 55 to effect the reopening of the main gate. The means which I employ for controlling the engagement between these gears and pinions preferably is operated by, or forms a part of, the dumping mechanism 103, (see Fig. 4) which operates automatically to dump the weighing hopper as soon as the dribble gate has been closed.

I shall now describe the dumping mechanism and the means for controlling the time of its operation, referring especially to Figures 4 and 5.

The weighing hopper 7 has a dumping bottom which may consist of two hinged doors 104 adapted to swing down on hinge pins 105. On each side of the weighing hopper I provide a lever 106 which is connected by links 107 with the hinged doors 104 so that when the levers 106 are dropped, the doors will swing open. I prefer to construct the dumping mechanism in such a way that it is held or detained normally in a position to hold the dumping bottom closed, but as soon as it is released the weight of the material in the hopper will operate to swing the doors 104 downwardly and thereby dump the hopper. In order to accomplish this, the dumping mechanism 103 is preferably carried principally on the front wall 108 of the hopper and I provide a dumping gear wheel 109 which is rigidly secured to a horizontal shaft 110 (see Fig. 4) which is mounted to rotate in a suitable bearing 111 secured to the side of the hopper near its upper edge. A similar bearing 112 is mounted on the other side of the middle line of the hopper and carries a shaft 113. Associated with the gear wheel 109 I provide means for holding the gear wheel up when the hopper is dumped, in such a way as to prevent the gear wheel 109 from moving away from a corresponding gear wheel 114 which is mounted just above it, and so as to rotate on a fixed axis, that is to say, the driving gear wheel 114 is mounted in suitable bearings 115 carried on the bottom plate 18. This means for holding up the gear wheel 109 is preferably in the form of a disk 116 which is rigidly attached to the shaft 113. A connection is provided from the dumping gear wheel 109 to the dumping lever or levers 106 in order to control the dumping levers and permit them to drop when the load in the hopper is to be dumped, and this connection also enables the dumping bottom to be closed thereafter. The driving gear 114 may be driven continuously from above by a continuously driven gear wheel 117 which is carried by the aforesaid shaft 103. This shaft may be driven through suitable bevel gears 118 from a shaft 119 which constitutes an inner shaft for the feed screw 5.

The connection between the levers 106 and the dumping gear wheel 109 is preferably in the form of a connecting rod or link 120 of special form, the lower end of the connecting rod being formed into cross head 121. The ends of this cross head are pivotally attached by pivot bolts 122 to the free ends of the levers 106. The upper end of the connecting rod 120 has a pivotal connection on a crank pin 123 which connects the dumping gear wheel 109 to the disk or wheel 116. In Figure 5, the dumping mechanism 103 is illustrated in a relation corresponding to the closed position of the dumping bottom, and at this time, dumping gear wheel 109 is detained by suitable detent means so that it cannot rotate. This detent means holds the pivotal connection or crank pin 123 in an elevated position and so that when the detent means is released, the weight in the hopper will tend to pull the levers 106 down; the gear wheel 109 and the disk 116 will then rotate and permit the contents of the hopper to be dumped. The means for detaining the dumping gear wheel 109 may be in the form of a detent pawl 124 (see Fig. 5) the end of which engages a detent tooth 125 formed on the upper end of the connecting rod 120. This detent pawl 124 is mounted on a pivot 126 on the edge of the dumping hopper, and has a rigid release arm 127 which extends upwardly through the bottom plate 18 and lies adjacent to the shaft 67$^a$ (see Fig. 4); the shaft 67$^a$ carries a cam 128. Now, when the dribble gate 17 closes through the action of this spring 61, it operates through the connecting rod 66 to rotate the shaft 67$^a$ and this causes the cam 128 to actuate the upper end of the pawl or the arm 127, causing a rocking movement of the pawl 124 on its pivot 126; that is to say, it raises the pawl 124 so as to release the dumping gear wheel 109.

It will be evident that the pivotal connection or crank pin 123 is held elevated when the dumping bottom or doors 104 are held closed. I prefer to place this pivotal connection so that the connecting rod 120 is nearly on its dead center, and I provide means independent of the weight on the hopper bottom to initiate a rotary movement of the dumping gear 109, that is to say, I provide means, which immediately upon the release of the dumping gear, tends to give the dumping gear a slight rotation, thereby moving the crank pin 123 off of the dead center; in this way the speed of the dumping operation is accelerated. In order to accomplish this I prefer to provide a leaf spring 129 which is attached to the outer side of the forward wall 108 of the hopper, and the outer face of the dumping gear 109 is provided with a projecting part such as a pin carrying a roller 130 which is adapted to engage the spring 129 and deflect it inwardly toward the plane of the forward wall 108. In other words, when the parts are in the relation shown in Figure 5, the spring 129 is in a deflected condition and as soon as the pawl 124 is released it exerts its force on the roller 130 to initiate a left hand rotation in the dumping gear.

I shall now describe how the dumping doors 104 are closed automatically after the dumping operation. In this connection, it should be noted that the teeth of the dumping gear 109 are not continuous, but a gap 131 is formed in these teeth. In the locked or detained position of the dumping mechanism this gap is directly opposite to the continuously rotating gear wheel 114, but on account of the gap the rotation of the gear wheel 114 does not affect the dumping gear wheel 109. As the load accumulates in the weighing hopper, it should be understood that the hopper descends and consequently the dumping gear 109 may be moved a considerable distance away from the gear wheel 114. However, directly after the dumping operation, a connection or meshing engagement is immediately effected automatically between the dumping gear wheel and the gear 114. The means for accomplishing this effect will now be described; it simply consists of a roller or small wheel 132 which is carried on an arm 133 extending upwardly from a rock shaft 134. This roller 132 is yieldingly held in the position shown in Figure 5 by means of a small spring 135 which thrusts against the inner side of the forward wall 136 of the casing, the rear end of the spring thrusting against the arm 137 which extends down from the rock shaft 134. The stud 138 limits the outward movement of the arm 137. Directly opposite to the gap 131 and immediately over the roller 132 the disk 116 is provided with a recess or deep notch 139. This notch permits the disk 116 to descend freely and unobstructedly when the weighing hopper 7 is descending under the load accumulating in it. When the pawl 124 is released however, the rotation of the disk 116 which occurs as the dumping doors 104 swing downwardly, operates to cause the regular circular edge of the disk 116 to ride or "cam" upon the roller 132. This will immediately raise the dumping gear 109 and bring its teeth into engagement with the gear wheel 114. This gear wheel is continuously rotating in the direction of the arrow in Figure 5, and hence before the free rotation of the dumping gear 109 in the dumping movement, has finished, the teeth of the gear 109 are picked up or brought into mesh with the teeth of the gear wheel 114. Hence after the levers 106 are dropped as far as possible their upward movement immediately begins by reason of the continued rotation of the dumping gear 109 through the agency of the gear wheel 114. This rotation of the dumping gear 109 by the gear wheel 114 will continue until the gap 131 arrives at the meshing point of the two gears, whereupon the gap 131 will effect a release of the dumping gear 109 from the gear wheel 114. The rotation of the dumping gear 109 however, will continue by reason of the spring 129, which spring will operate to rotate the dumping gear until the tooth 125 on the end of the connecting rod 120 engages the end of the pawl 124 and this will stop the dumping mechanism in the locked position.

I also provide automatic means for reopening the gate means and for resetting the tripping mechanisms in their set positions. This means is preferably actuated by the dumping mechanism. For this purpose, I prefer to utilize the shaft 110 to effect the reopening of the main gate and to effect the resetting of the tripping mechanism 41. Likewise I employ the shaft 113 to effect the reopening of the dribble gate and the resetting of its tripping mechanism including the trip-lever 75. In order to do this, I simply provide the shaft 110 with a cam 140 (see Figs. 4 and 10); this cam engages a roller 141 carried on a short arm 142 on the aforesaid rock shaft 45 (see Fig. 10); this produces an upward movement in the lifting stem 42 (see Fig. 10) and raises the gear wheel 54 so that its low teeth 57 will mesh with the teeth of the pinion 55 which is continuously rotating. This will cause the rotation of the gear wheel 54 in the direction of the arrow upon it in Figure 10 and this rotation will continue until the gap 56 arrives at the meshing point of the pinion and gear wheel (see Fig. 9). When this occurs the gear wheel 54 will release itself from the pinion 55. It should be noted that this will not occur until the crank pin 31 has passed its inner dead center and is starting out. This is important because it enables the spring 26 to continue the rotation of the gear wheel 54 until the tooth 32 on the detent wheel 29 comes up against the corresponding tooth on the detent plate 33. By similar means the dribble gate will be reopened and held in its open position. The means for this purpose will now be described.

On the shaft 113 I provide a cam 143 which is similar to the cam 140 and when shaft 113 rotates this cam actuates a roller 144 carried on a short arm 145 of the rock shaft 74 (see Fig. 7); this operates to rock the spring barrel and causes an upward thrust in the lifting stem 72. When this occurs the detent wheel 63 is in the position shown in Figure 8, and the gear wheel 101 is in the position indicated in Figure 8ª, hence, when the gear wheel 101 is raised by the cam 143 its teeth will mesh with the continuously rotating pinion 102. This will cause the rotation of the gear wheel 101 in the direction indicated by the arrow in Figure 8ª and this rotation will continue until the gap 146 in the teeth of this gear arrives at the meshing point with the pinion; when this occurs the gear wheel 101 will release itself from engagement with the pinion. This will not occur however, until the crank pin 67 (see Fig. 7) has passed slightly beyond the inner dead center, and hence the spring 61 will operate to continue the rotation in the same direction. This rotation will continue until the detent tooth 65 engages the detent plate 64, thereby holding the dribble gate open.

In order to insure that the gear wheels 54 and 101 will be held at the proper distance from their corresponding pinions, when they are raised by their corresponding cams, I provide two stems 147 (see Fig. 4) which extend down from the undersides of bearings 148 which carry the ends of the shaft 103. These stems 147 operate as fixed stops to keep the gears at the proper distance from the shaft 103.

Figure 3:
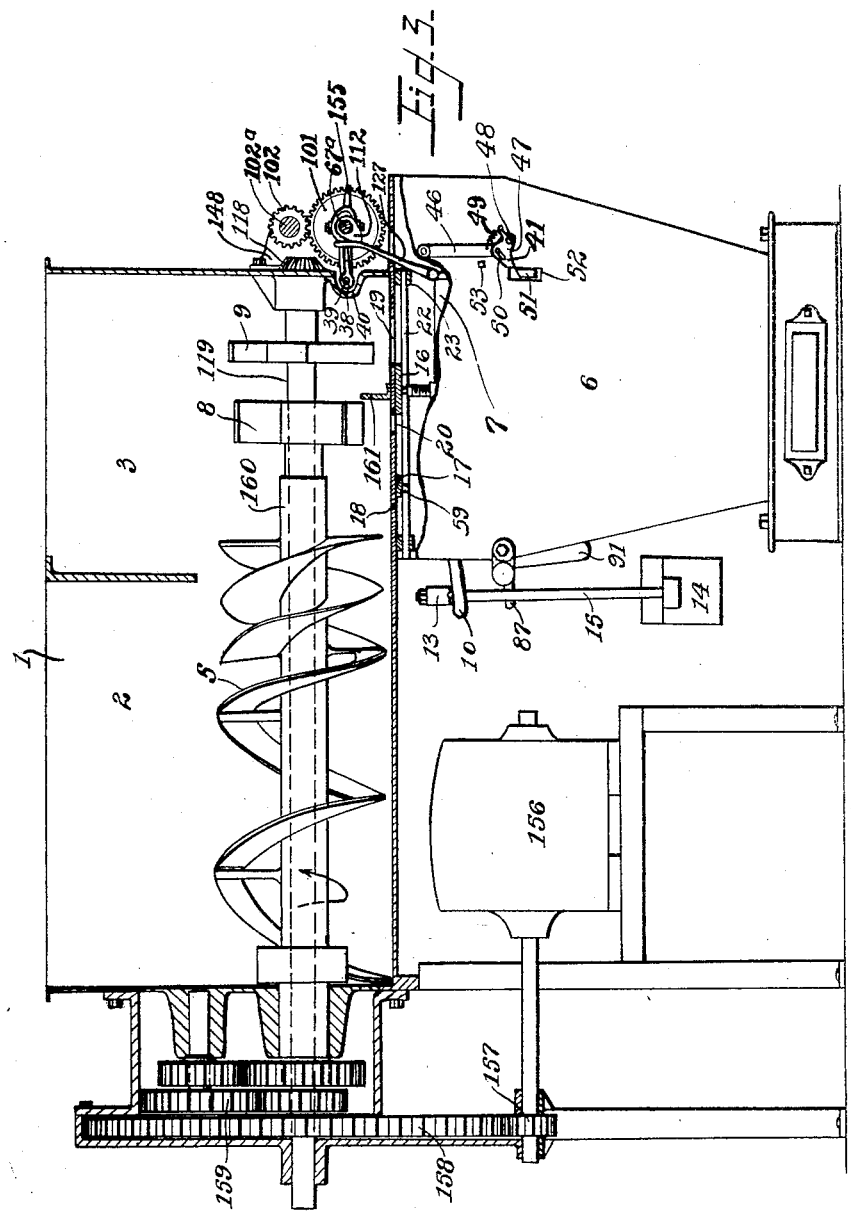
Figure 3 is a longitudinal vertical section through the upper part of the machine, the casing for the weighing hopper being shown broken away and partially in elevation.

When the cam 140 operates the rock shaft 45 it swings the lever arm 46 toward the left and this permits the pawl 47 to trip over the lug or dog 51 which extends out through the side of the casing 6 (see Fig. 3). This will latch the tripping mechanism 41 again in its set position.

Similarly, when the rock shaft 74 is rocked by its cam 143, the lever or arm 75 will swing toward the left (see Fig. 1ᵃ) and when it has moved a sufficient distance the small spring 79 will pull the end of the pawl 76 down so that it will lie against the end of the lever 80, thereby latching this tripping mechanism in its set position so that the balance lever 80 will be held against rising.

I shall now describe a small counterbalance or pea that I provide to regulate the movement of the scale beam composed of the scale levers 10. The levers 10 are connected by a cross bar or fulcrum bar 149. On the same side with the dribble tripping mechanism (see Fig. 1), this fulcrum bar 149 extends through the side wall of the casing 6 and carries a round head 150. To this head 150 there is attached a small scale bar 151 which is bifurcated (see Fig. 1ᵇ); on this scale there is adjustably mounted a small counterweight or pea 152.

I provide means for controlling the position of the dumping cam 128 so that the machine can be thrown out of operation at will. For this purpose the cam is attached on a sliding sleeve 153 (see Figs. 4 and 12). This sleeve runs on a feather 154 on the side of the shaft 67ᵃ and may be thrown toward the right or toward the left by means of a hand lever 155 which connects with the sleeve.

The machine may be driven by means of an electric motor 156 (see Fig. 3) mounted under the receiver. Through a pinion 157 this motor drives a large gear wheel 158; this large gear wheel 158 drives reduction gearing 159 of any suitable construction which operates to drive the aforesaid shaft 119 at the required speed. It will be noted that this shaft carries one of the bevel gear wheels 118 that effects the continuous driving of the shaft 103 (see Fig. 4). The rotary beater or impeller 9 is carried on the shaft 119, but the beater or impeller 8 is rotated at a reduced speed, being carried by a tubular shaft 160 rotatably mounted on the inner shaft 119 (see Fig. 3). This tubular shaft 160 carries the aforesaid screw 5. The direction of rotation being that indicated by the arrow in Figure 3, it will be evident that the material will be fed from the compartment 2 into the compartment 3 where it comes under the influence of the beaters or impellers 8 and 9. In order to insure an ample supply of material for the dribble opening 20, I prefer to provide a small baffle plate 161 just beyond the beater 8.

I shall now describe the general mode of operation of the entire machine.

When the gate means is open a relatively large stream of the material is passing to the weighing hopper. At a predetermined time, controlled by the hopper, this large stream is partially shut off so as to leave a relatively small stream flowing. As soon as the weight in the weighing hopper arrives at a predetermined weighing limit for which the mechanism is set, the gate means completely closes automatically. The weighing hopper is then automatically dumped, and its dumping bottom is reclosed, the gate means is reopened and the tripping mechanism automatically placed again in its set position.

Figure 1:
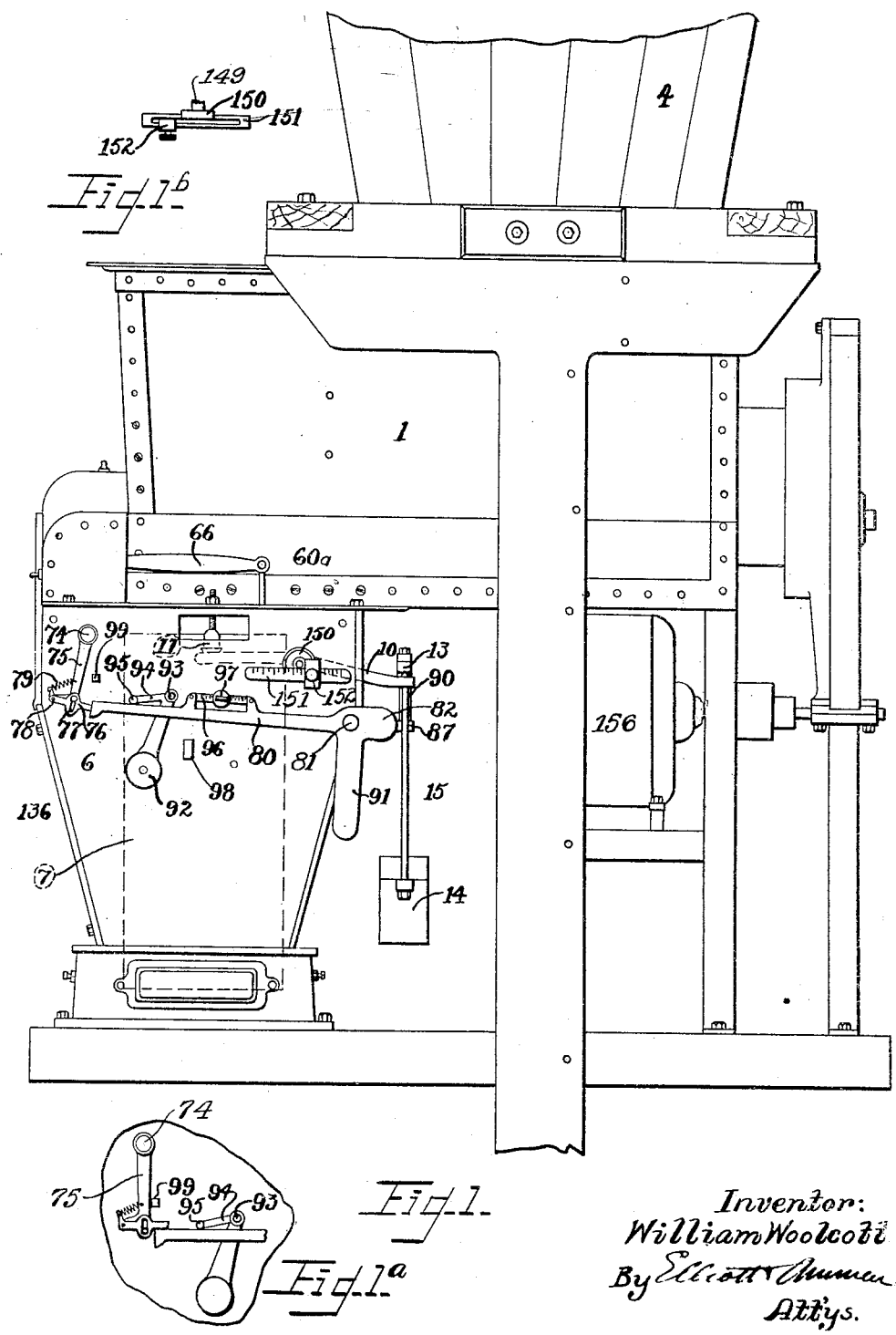

To describe this operation more specifically as performed by a machine of the construction particularly set forth, it should be understood that while the weighing hopper is being filled a relatively large stream is flowing into it through the main opening 19 and a smaller stream is also flowing through the opening 20 (see Fig. 5). At a predetermined point the weighing hopper 7 descends slightly under the weight of the load carried by it, and the dog 51 (see Fig. 3) releases or actuates the tripping mechanism 41. This permits the stem 42 to drop (see Fig. 4) and this lets down the shaft 34 and disengages the detent wheel 28 from the fixed detent plate 33 (see Fig. 9). The spring 26 immediately initiates a closing movement of the main gate 16 but the movement is slightly retarded by the pinion 55 which engages with the high teeth 58 of the gear wheel 54. However, the high teeth 58 eventually run out of mesh with the pinion 55 (see Fig. 10) and this leaves the gate in its closed position. A relatively small stream continues to flow through the opening 20 and when the load in the hopper reaches the amount for which the scales are set, the balance lever 80 will swing downwardly until its outer end moves below the end of the pawl 76 (see (Figs. 1, 1ᵃ and 7). When this occurs the arm 75 will swing toward the right and come against its stop 99, thereby permitting the detent wheel 63 to drop away from the fixed detent 64; this will permit the spring 61 to close the dribble gate 17. The closing of the dribble gate incidentally rotates the shaft 67ᵃ (see Fig. 4), and this swings the cam 128 (see Fig. 5) toward the right and actuates the pawl arm or lever 127; this disengages the pawl 124 from the tooth 125. As soon as this is done the leaf spring 129 exerts force against the roller 130 to initiate a rotary movement of the dumping gear 109, thereby permitting the connecting rod 120 to drop. This drops the levers 106 and this dumps the bottom of the weighing hopper by moving the swinging doors 104 downwardly. The rotary movement of the dumping gear 109 moves the gap 130 away from the meshing point between the gear 109 and the gear 114 and hence causes a meshing of the teeth of the gear 109 with the teeth of the gear 114. In this connection it should be understood that at the instant that the dumping movement starts, the notch 139 in the disk 116 will lie adjacent to the upper edge of the roller 132, but as soon as the dumping movement is well under way the edge of the disk 116 will exert a cam action on the roller 132, thereby raising the dumping gear 109 to about the position in which it is shown in Figure 5, that is to say, it will raise it sufficiently to enable its teeth to mesh with the gear wheel 114. Hence the dumping gear 109 will be rotated in the same direction in which it moved in the dumping movement. This continued rotation will complete the dumping movement and continue the rotation of the dumping gear 109 until the bottom doors 104 are closed. The rotation will continue until the gap 131 in the teeth of the dumping gear 109 effects a disengagement with the driving gear wheel 114. This will not occur however, until the pivotal connection with the crank pin 123 is substantially on or past its upper dead center, and when the release occurs the spring 129 exerting its force against the roller 130 continues the rotation of the dumping gear 109 until the tooth 125 engages the end of the pawl 124, thereby locking the dumping mechanism in the closed position.

The actuation of the dumping mechanism operates automatically to reopen the gates and reset the tripping mechanisms. This is accomplished through the medium of the cams 140 and 143 which operate the lifting stems 42 and 72. By operating the lifting stem 42 the gear wheel 54 is brought into mesh with its corresponding continuously driven pinion 55 (see Fig. 10). Raising this gear wheel 54 will cause it to mesh with pinion 55 which then rotates the gear wheel 54 until the gap 56 in the teeth releases or opens the connection. When this occurs the crank pin 31 will be beyond the inner center and hence the spring 26 will continue the rotation until the detent tooth 32 engages the tooth of the detent plate 33 (see Fig. 9).

By a similar mode of operation the gear wheel 101 co-operates with its pinion 102 so as to open the dribble gate 17 and effect a disengagement of tooth 65 of the detent wheel 63 from the detent plate 64. The actuation of the lifting stems 42 and 72 is effected through their corresponding rock shafts 45 and 74. The movement of the rock shaft 45 swings the trip lever 46 toward the left and replaces it in its set position. Likewise, the rotation of the rock shaft 74 swings the trip lever 75 toward the left (see Figs. 1 and 1ª) and this effects the resetting of the dribble tripping mechanism.

What I claim is:

1. In an automatic weighing machine, the combination of a casing, a weighing hopper to receive the material to be weighed, a gate for controlling the flow of the material into the weighing hopper mounted at the bottom of the hopper, closing means acting independently of the weighing hopper for closing the gate, tripping mechanism controlled by the load in the hopper for controlling the time of operation of the closing means, said tripping mechanism including movable parts and a relatively fixed detent co-operating therewith, and mounted on the casing, said tripping mechanism operating when tripped, to disengage the said moving parts from the relatively fixed detent.

2. In an automatic weighing machine, the combination of a weighing hopper to receive the material to be weighed, a gate for controlling the flow of the material into the weighing hopper, closing means acting independently of the weighing hopper for moving the gate toward its closed position, tripping mechanism controlled by the load in the hopper for controlling the time of operation of the closing means, and power-actuated means co-operating with the closing means to oppose the action of the closing means and effect the gradual closing of the gate.

3. In an automatic weighing machine, the combination of a casing, a hopper to receive the material to be weighed, a gate for controlling the flow of the material into the weighing hopper, tripping-mechanism including movable parts and a relatively fixed detent co-operating therewith and mounted on the casing, said tripping mechanism operating when tripped, to disengage the said moving parts of the tripping mechanism from the relatively fixed detent, means actuated by a force independent of the weighing hopper for initiating the closing movement of the gate, and power-actuated means for effecting the closing of the gate thereafter.

4. In an automatic weighing machine, the combination of a hopper to receive the material to be weighed, a compartment for the material having a bottom with a large feed opening and a small feed opening, continuously driven feeding means within the compartment for moving the material into position over the openings, mechanically driven means located over the large opening for accelerating flow of the material through the large opening into the hopper, automatic mechanism controlled by the hopper, operating first to close the main feed opening and leave the small feed opening unaffected, and secondly, operating to close the small feed opening when a predetermined weight has been received by the hopper.

5. In an automatic weighing machine, the combination of a hopper to receive the material to be weighed, a compartment for the material, having a bottom with a large feed opening and a small feed opening, continuously driven feeding means within the compartment for moving the material over the feed openings, mechanically driven means located over the large opening for accelerating the flow of a relatively large stream of the material through the large opening into the hopper, continuously driven means located over the small feed opening for accelerating the flow of a relatively small stream through the small opening, automatic mechanism operated by the hopper, operating first to close the main feed opening and leave the small feed opening unaffected, and secondly, operating to close the small feed opening when a predetermined weight has been received by the hopper.

6. In an automatic weighing machine, the combination of a compartment for the material to be weighed, having a bottom with a large feed opening, and also having a small feed opening removed from the large opening, a hopper to receive the material to be weighed, gate mechanism including sliding means guided on the bottom, operating to permit a relatively large stream of the material to flow into the hopper through the large opening and to permit a small stream to flow simultaneously through the small opening, tripping mechanism actuated by the hopper when a predetermined weight of the material has accumulated therein, to control the gate mechanism to shut the large opening and permit a small stream to continue flowing through the small opening, and tripping mechanism actuated by the hopper when a predetermined weight of the material has accumulated due to the flow of the small stream, and thereby control the gate mechanism to close the small opening, and automatic means for restoring the tripping mechanism to its set position.

7. In an automatic weighing machine, the combination of a weighing hopper to receive the material to be weighed, gate mechanism operating to permit a stream of the material to flow into the weighing hopper, tripping mechanism for controlling the gate mechanism, said hopper having a part co-operating with the tripping mechanism to hold the same in a set position while the hopper is being filled, and operating to trip the tripping mechanism when a predetermined weight of material has accumulated in the hopper, gate closing means detained by the tripping mechanism and operating when released by the tripping mechanism, to nearly shut off the flow of the material, but so as to permit a small stream to continue flowing, a second tripping mechanism, said machine having a part for holding the second named tripping mechanism in a set position while the hopper is receiving material from the small stream only, and operating to trip the second named tripping mechanism when the limit weight of material has accumulated in the hopper, said second named tripping mechanism controlling the gate mechanism to stop the flow of the small stream and thereby completely shut off the flow of the material.

8. In an automatic weighing machine, the combination of a casing, a weighing hopper for receiving the material to be weighed, a gate operating to permit a stream of the material to flow into the weighing hopper, tripping-mechanism controlled by the hopper so as to be actuated when a predetermined weight of the material has accumulated in the hopper, said tripping-mechanism including movable parts and a relatively fixed detent co-operating therewith and carried by the casing, means carried by the hopper and co-operating with the movable parts of the tripping-mechanism to effect a disengagement thereof from the fixed detent, and gate closing means controlled by the actuation of the tripping-mechanism.

9. In an automatic weighing machine, the combination of a casing, a weighing hopper for receiving the material to be weighed, a gate operating to permit a stream of the material to flow into the weighing hopper, tripping-mechanism including movable parts and a relatively fixed detent co-operating therewith and mounted on the casing, said tripping-mechanism operating when tripped to disengage the said moving parts from the relatively fixed detent, means carried by the hopper for tripping the tripping-mechanism, a power-driven member, and means actuated automatically thereby when the tripping-mechanism is tripped, to reopen the gate and reset the tripping-mechanism.

10. In an automatic weighing machine, the combination of a receiver, a weighing hopper, a gate operating to permit a stream of the material to flow into the weighing hopper, a rotatable member connected with the gate, means for supporting the same in an elevated or in a depressed position, tripping mechanism including a fixed detent operating to engage and detain the said rotatable member against rotation when in its elevated position, said hopper having means for actuating the tripping mechanism to permit the rotatable member to fall to its depressed position, and thereby release the rotatable member, and means operating after the release of the rotatable member to close the gate.

11. In an automatic weighing machine, the combination of a weighing hopper, a gate operating to permit a stream of the material to flow into the weighing hopper, a detent wheel, means for supporting the same in an elevated or a depressed position, a connecting rod connecting the detent wheel with the gate, a spring tending to close the gate and rotate the detent wheel, tripping mechanism including a fixed detent for engaging the wheel when in its elevated position to prevent rotation thereof, said hopper having means for actuating the trip-mechanism to permit the detent wheel to fall and thereby release the detent wheel from the detent and permit the spring to move the gate in the closing direction.

12. In an automatic weighing machine, the combination of a weighing hopper, a gate operating to permit a stream of the material to flow into the weighing hopper, tripping mechanism including a fixed detent, a detent wheel adapted to engage the detent to prevent rotation of the detent wheel, means for supporting the detent wheel to enable the same to be shifted laterally, a connecting rod connecting the detent wheel with the gate, a spring tending to close the gate, said hopper having means for actuating the tripping mechanism to effect a lateral movement of the detent wheel to release the same from the fixed detent and thereby permit the spring to move the gate in the closing direction.

13. In a machine of the character described, the combination of a gate, a gear wheel, means for supporting the same to enable it to be shifted laterally, a crank pin connected with the gear wheel so as to be rotated thereby, a connecting rod connecting the crank pin with the gate for closing the gate, a power-driven pinion, means for moving the gear wheel laterally to bring the same into mesh with the pinion to close the gate, said gear wheel having a gap in the teeth thereof to effect a disconnection of the same from the pinion, a spring tending to close the gate and rotate the crank pin, and detent means for preventing the rotation of the crank pin to hold the gate open.

14. In a machine of the character described, the combination of a gate, a gear wheel, a detent wheel rigid therewith, a crank pin rigid with the gear wheel and the detent wheel, a connecting rod connecting the crank pin with the gate for closing the gate, means for holding the gear-wheel and detent wheel in an elevated or in a depressed position, a power-driven pinion meshing with the gear wheel when in its elevated position to rotate the same to close the gate, said gear wheel having a gap in the teeth thereof to effect the disconnection of the same from the pinion, a spring tending to close the gate and rotate the crank pin, and detent means for preventing the rotation of the detent wheel to hold the gate open, said crank pin being located so that when the detent wheel is engaging the detent means the crank pin is located off its dead center, whereby when the detent wheel is released from the detent means, the spring will close the gate and rotate the crank pin.

15. In a machine of the kind described, the combination of a gate, a detent wheel connected with the gate for opening the same, tripping mechanism including a fixed detent to engage the detent wheel to hold the gate open, means for mounting the detent wheel to permit a shifting movement thereof away from the fixed detent to permit the closing of the gate, a hopper having means for actuating the tripping mechanism when a predetermined load is in the hopper, and means for closing the gate after the tripping mechanism is actuated.

16. In a machine of the kind described, the combination of a gate, a detent wheel connected with the gate for opening the same, tripping mechanism including a fixed detent to engage the detent wheel to hold the gate open, means for mounting the detent wheel to permit a shifting movement thereof away from the fixed detent to permit the closing of the gate, a hopper having means for actuating the tripping mechanism when a predetermined load is in the hopper, means for closing the gate after the tripping mechanism is actuated, and automatic means for resetting the tripping mechanism in a position to hold the detent wheel in engagement with the fixed detent.

17. In a machine of the kind described, the combination of a gate, a detent wheel connected with the gate for opening the same, tripping mechanism including a fixed detent to engage the detent wheel to hold the gate open, means for mounting the detent wheel to permit a shifting movement thereof away from the fixed detent to permit the closing of the gate, a hopper having means for actuating the tripping mechanism when a predetermined load is in the hopper, and means for gradually closing the gate after the tripping mechanism is actuated.

18. In a machine of the character described, the combination of a hopper, a gate for controlling the stream of material flowing to the hopper, a scale beam supporting the hopper, means for closing the gate, tripping mechanism having a set position for controlling the time of operation of the said gate closing means, said hopper having means co-operating with the tripping mechanism to release the gate closing means when the hopper descends under the weight of the load in the hopper, a relatively fixed power-driven member, means for dumping the contents of the hopper after the tripping mechanism has been actuated, means actuated by the power-driven member for reopening the gate, and means carried by the hopper and also actuated by the power-driven member, for resetting the tripping mechanism.

19. In a machine of the character described, the combination of a hopper, a gate controlling the stream of material flowing to the hopper, a scale beam supporting the hopper, means for closing the gate, tripping mechanism having a set position for controlling the time of operation of said gate closing means, said hopper having means co-operating with the tripping mechanism to release the gate closing means when the hopper descends under the weight of the load in the hopper, a relatively fixed power-driven member, means for dumping the contents of the hopper after the tripping mechanism has been actuated and thereby enabling the hopper to rise, and means carried by the hopper for engaging the power-driven member for reopening the gate and for resetting the tripping mechanism.

20. In a machine of the character described, the combination of a hopper, a gate for controlling the stream of material flowing to the hopper, a scale beam supporting the hopper, means for closing the gate, tripping mechanism having a set position for controlling the time of operation of the said gate closing means, said hopper having means cooperating with the tripping mechanism to release the gate closing means when the hopper descends under the weight of the load in the hopper, a driven gear wheel mounted to rotate about a relatively fixed axis, means for dumping the contents of the hopper after the tripping mechanism has been actuated, thereby enabling the hopper to rise, and a gear wheel carried by the hopper for engaging the driven gear wheel when the hopper rises after dumping the load, and means actuated by the last named gear wheel for resetting the tripping mechanism.

21. In a machine of the character described, the combination of a hopper, a gate for controlling the stream of material flowing to the hopper, a scale beam supporting the hopper, means for closing the gate, tripping mechanism having a set position for controlling the time of operation of the said gate closing means, said hopper having means cooperating with the tripping mechanism to release the gate closing means when the hopper descends under the weight of the load in the hopper, a power-driven gear wheel mounted to rotate about a relatively fixed axis, said hopper having a dumping bottom, means for actuating the dumping bottom to dump the load from the hopper when the tripping mechanism is actuated, thereby enabling the hopper to rise, a gear wheel carried on the hopper to mesh with the driven gear wheel when the hopper rises, and means actuated by the last named gear wheel for resetting the tripping mechanism and for closing the dumping bottom.

22. In a machine of the character described, the combination of a hopper, a gate for controlling the stream of material flowing to the hopper, a scale beam supporting the hopper, means for closing the gate, tripping mechanism including a detent and having a set position for controlling the time of operation of the gate closing means, said hopper having means co-operating with the tripping mechanism to release the gate closing means from the detent when the hopper descends under the weight of the load in the hopper, a driven gear wheel mounted to rotate about a relatively fixed axis, said hopper having a dumping bottom and dumping mechanism for automatically moving the same to dump the contents of the hopper when the tripping mechanism has been actuated, thereby enabling the hopper to rise, a gear wheel carried by the hopper to mesh with the driven gear wheel when the hopper rises, for actuating the dumping mechanism to close the hopper bottom, and means actuated by the last named gear wheel for resetting the tripping mechanism.

23. In a machine of the character described, the combination of a hopper, a gate for controlling the stream of material flowing to the hopper, a dumping bottom for the hopper, dumping mechanism for the dumping bottom, detent means for preventing the operation of the dumping mechanism, tripping mechanism actuated by the hopper for effecting the closing of the gate, and automatic means controlled by the tripping mechanism for actuating the detent means to permit the operation of the dumping mechanism.

24. In a machine of the character described, the combination of a hopper, a gate for controlling the stream of the material flowing to the hopper, gate closing means, a dumping bottom for the hopper, dumping mechanism for the dumping bottom, detent means for preventing the operation of the dumping mechanism, tripping mechanism actuated by the hopper, for controlling the time of operation of the gate closing means, means actuated by the gate closing means for releasing the detent means to permit the dumping mechanism to effect the dumping movement of the bottom.

25. In a machine of the character described, the combination of a hopper, a gate for controlling the stream of the material flowing to the hopper, a wheel, a connecting rod connecting the same with the gate, a spring for closing the gate and for rotating the wheel, tripping mechanism including detent means for preventing the rotation of the wheel to hold the gate open, means for actuating the tripping mechanism by the hopper, said hopper having a dumping bottom and dumping mechanism for controlling the same, detent means for preventing the dumping mechanism from actuating the dumping bottom, and means for releasing the detent means actuated by the rotation of the wheel when the gate is closed.

26. In a machine of the character described, the combination of a hopper, a gate for controlling the stream of the material flowing to the hopper, a wheel, a connecting rod connecting the same with the gate, a spring for closing the gate and for rotating the wheel, tripping mechanism including detent means for preventing the rotation of the wheel to hold the gate open, means for actuating the tripping mechanism by the hopper, said hopper having a dumping bottom and dumping mechanism for controlling the same, detent means for preventing the dumping mechanism from actuating the dumping bottom, means for releasing the detent means actuated by the rotation of the wheel when the gate is closed, and automatic means for reopening the gate and resetting the tripping mechanism.

27. In a machine of the character described, the combination of a hopper, a gate for controlling the stream of the material flowing to the hopper, a wheel, a connecting rod connecting the same with the gate, a spring for closing the gate and for rotating the wheel, tripping mechanism including detent means for preventing the rotation of the wheel to hold the gate open, means for actuating the tripping mechanism by the hopper, said hopper having a dumping bottom and dumping mechanism for controlling the same, detent means for preventing the dumping mechanism from actuating the dumping bottom, means for releasing the detent means actuated by the rotation of the wheel when the gate is closing, automatic means for reopening the gate, for resetting the tripping mechanism and for closing the dumping bottom.

28. In a machine of the character described, the combination of a hopper, a gate for controlling the stream of the material flowing to the hopper, a wheel, a connecting rod connecting the same with the gate, a spring for closing the gate and for rotating the wheel, tripping mechanism including detent means for preventing the rotation of the wheel to hold the gate open, means for actuating the tripping mechanism by the hopper, said hopper having a dumping bottom, dumping levers for dumping the bottom, a dumping wheel connected with the dumping levers, a detent pawl associated with the dumping wheel for preventing the dumping bottom from dumping, and a cam actuated by the first named wheel, for releasing the pawl when the gate is closed to effect the dumping of the hopper.

29. In a machine of the character described, the combination of a hopper, a gate for controlling the stream of the material flowing to the hopper, a wheel, a connecting rod connecting the same with the gate, a spring for closing the gate and for rotating the wheel, tripping mechanism including detent means for preventing the rotation of the wheel to hold the gate open, means for actuating the tripping mechanism by the hopper, said hopper having a dumping bottom and dumping levers for controlling the dumping bottom, a dumping wheel, a connecting rod connecting the dumping wheel with the levers, a pawl for engaging the same to hold the dumping bottom closed, and means for releasing the pawl, actuated by the rotation of the first named wheel when the gate is closed.

30. In a machine of the character described, the combination of a hopper, a gate for controlling the stream of the material flowing to the hopper, a wheel, a connecting rod connecting the same with the gate, a spring for closing the gate and for rotating the wheel, tripping mechanism including detent means for preventing the rotation of the wheel to hold the gate open, means for actuating the tripping mechanism by the hopper, said hopper having a dumping bottom and dumping levers for controlling the dumping bottom, a dumping wheel, a connecting rod connecting the dumping wheel with the levers, a pawl for engaging the same to hold the dumping bottom closed, means for releasing the pawl, actuated by the rotation of the first named wheel, and automatic means for rotating the dumping wheel to close the dumping bottom.

31. In a machine of the character described, the combination of a hopper, a gate for controlling the stream of the material flowing to the hopper, a wheel, a connecting rod connecting the same with the gate, a spring for closing the gate and for rotating the wheel, tripping mechanism including detent means for preventing the rotation of the wheel, to hold the gate open, means for actuating the tripping mechanism by the hopper, said hopper having a dumping bottom and dumping levers for controlling the dumping bottom, a dumping gear wheel, a connecting rod connecting the dumping gear wheel with the levers, a pawl associated therewith to hold the dumping bottom closed, means for releasing the pawl actuated by the rotation of the first named wheel, when the gate is closed, a continuously driven gear wheel adapted to be engaged by the dumping gear wheel, said continuously driven gear wheel operating to rotate the dumping gear wheel to close the dumping bottom.

32. In an automatic weighing machine, the combination of a weighing hopper constructed to be supported on a weighing scale, a dumping gear wheel carried by the hopper, a dumping bottom controlled by the dumping gear wheel, a detent pawl associated with the dumping gear wheel to prevent the dumping bottom from dumping the contents of the hopper, automatic means controlled by the movement of the hopper for actuating the pawl to release the dumping gear wheel and permit the bottom to dump, and a continuously driven gear wheel adapted to mesh with the dumping gear wheel to close the hopper bottom.

33. In an automatic weighing machine, the combination of a hopper adapted to be supported on a weighing scale, a dumping bottom on the hopper, a dumping gear wheel carried by the hopper, a connecting rod attached to the gear wheel for controlling the dumping bottom, a detent pawl associated with the gear wheel to prevent rotation thereof and thereby prevent the dumping bottom from dumping, automatic means controlled by the movement of the hopper for releasing the pawl to permit the dumping bottom to dump, and a continuously driven gear wheel adapted to mesh with the dumping gear wheel for rotating the same to close the bottom, said dumping wheel having a gap in the teeth thereof operating to disengage the dumping gear wheel from the driven gear wheel when the dumping bottom has been closed.

34. In an automatic weighing machine, the combination of a weighing hopper adapted to be supported on the weighing scale, a dumping bottom for the hopper, a dumping gear wheel carried by the hopper, a connecting rod for controlling the dumping bottom and having a pivotal connection with the dumping gear wheel, a detent pawl associated with the dumping gear wheel, automatic means controlled by the movement of the hopper for actuating the pawl to release the dumping gear wheel and permit the dumping bottom to dump, means for rotating the dumping gear wheel to close the dumping bottom, the detent pawl operating to hold the gear wheel so that the said pivotal connection is at an elevated point whereby the weight of the material will operate to rotate the gear wheel when the pawl is released.

35. In an automatic weighing machine, the combination of a weighing hopper adapted to be supported on the weighing scale, a dumping bottom for the hopper, a connecting rod for controlling the dumping bottom, a gear wheel mounted on the hopper and having a pivotal connection with the connecting rod, means for rotating the gear wheel after the bottom is dumped so as to stop the gear wheel while the pivotal connection is at an elevated point, a detent pawl for holding the gear wheel with the pivotal connection at an elevated point, and automatic means controlled by the movement of the hopper for releasing the pawl to permit the dumping bottom to dump.

36. In an automatic weighing machine, the combination of a weighing hopper adapted to be supported on the weighing scale, a dumping bottom, a connecting rod for controlling the dumping bottom, a dumping gear wheel having a pivotal connection with the dumping bottom, means for rotating the gear wheel so as to exert force in the connecting rod to close the hopper bottom, a detent pawl associated with the dumping gear wheel to hold the bottom closed, means for releasing the detent pawl to permit the dumping bottom to dump, and a spring for initiating the rotation of the dumping gear wheel when the pawl is released, to accelerate the dumping action.

37. In an automatic weighing machine, the combination of a weighing hopper adapted to be supported on the weighing scale, a dumping bottom for the hopper, a connecting rod for controlling the dumping bottom, a dumping gear wheel carried by the hopper and having a pivotal connection with the connecting rod, a continuously driven gear wheel alining with the dumping gear wheel so as to engage the teeth thereof, said driven gear wheel operating to rotate the dumping gear wheel and thereby close the dumping bottom, said dumping gear wheel having a gap in the teeth thereof and operating to disengage the dumping gear wheel from the driven gear wheel when the hopper bottom is closed and the pivotal connection is at an elevated point, a detent pawl associated with the dumping gear wheel for preventing the rotation thereof in order to hold the dumping bottom closed, means associated with the dumping gear wheel for supporting the dumping gear wheel to effect the engagement between the teeth of the dumping gear wheel and the driven gear wheel, and automatic means for releasing the detent pawl.

38. In an automatic weighing machine, the combination of a weighing hopper adapted to be supported on the weighing scale, a dumping bottom for the hopper, a wheel rotatably carried on the hopper, and connected with the dumping bottom to control the dumping movement thereof, detent means associated with the wheel to prevent rotation thereof to hold the hopper bottom closed, automatic means controlled by the movement of the hopper for actuating the detent means to release the same when a predetermined load has accumulated in the hopper.

39. In an automatic weighing machine, tom, dumping mechanism for controlling the dumping bottom, means for closing the gate after the disengagement of the detent wheel from the fixed detent, means actuated by the gate closing means to control the dumping mechanism and thereby effect the dumping movement of the dumping bottom, means actuated by the dumping mechanism for raising the arm to enable the detent wheel to co-operate with the fixed detent, automatic means for rotating the detent wheel to effect engagement between the detent wheel and the fixed detent, and means actuated by the dumping mechanism to reset the tripping mechanism.

46. In a machine of the character described, the combination of a gate, a weighing hopper, a detent wheel connected with the gate for opening the same, a pivoted arm carrying the detent wheel, tripping mechanism including a fixed detent above the detent wheel to engage the same and thereby hold the gate open, means controlled by the weight of the load in the hopper for actuating the tripping mechanism to permit the arm to drop and thereby to disengage the detent wheel from the fixed detent, a dumping bottom for the hopper, dumping mechanism for controlling the same, detent means for the dumping mechanism to prevent the load in the hopper from being dumped, means for closing the gate after the disengagement of the detent wheel from the fixed detent, means actuated by the gate closing means for releasing the detent means from the dumping mechanism, thereby enabling the load in the hopper to dump automatically, a gear associated with the detent wheel for rotating the same, a continuously driven pinion to mesh with the gear wheel, means actuated by the dumping mechanism for raising the arm to bring the gear wheel into mesh with the pinion to cause the rotation of the detent wheel and thereby reopen the gate and re-engage the detent wheel with the fixed detent to hold the gate open, and means actuated by the dumping mechanism for resetting the tripping mechanism.

47. In a machine of the character described, the combination of a weighing hopper adapted to be supported on the weighing scale, a gate for controlling the flow of the material to the hopper, a dumping bottom for the hopper, dumping mechanism for the dumping bottom, tripping mechanism controlled by the weight of the load in the hopper, gate closing means controlled by the tripping mechanism, means controlled by the gate closing means for controlling the dumping mechanism to effect the dumping of the hopper, and means actuated by the dumping mechanism in dumping the hopper, for resetting the tripping mechanism and to reopen the gate.

48. In a machine of the character described, the combination of a continuously driven pinion and a continuously driven gear wheel, each mounted to rotate about a fixed axis, a weighing hopper adapted to be supported on the weighing scale, a gate for controlling the flow of the material to the hopper, gate mechanism constructed to co-operate with the pinion to open the gate, tripping mechanism controlled by the load on the hopper, including detent means for holding the gate open, said hopper having a dumping bottom and dumping mechanism for the same, said dumping mechanism including a dumping gear wheel co-operating with the said continuously driven gear wheel to close the hopper bottom, detent means associated with the dumping mechanism, gate closing means, said tripping mechanism operating to control the time of operation of the gate closing means, means actuated by the gate closing means for actuating the detent means of the dumping mechanism to effect the dumping of the load from the hopper, means actuated by the dumping mechanism to reset the tripping mechanism and to control the co-operation of the gate controlling means with the said pinion, to effect the reopening of the gate.

49. In a machine of the character described, the combination of a weighing hopper, a gate controlling the flow of the material to the hopper, gate closing means, tripping mechanism controlled by the load in the hopper for controlling the time of operation of the gate closing means, said hopper having a dumping bottom, a dumping gear wheel rotatably mounted on the hopper, a shaft adapted to rotate when the dumping gear wheel rotates, means actuated by the gate closing means for effecting the operation of the dumping mechanism to dump the load from the hopper, and means controlled by the said shaft for resetting the tripping mechanism and for reopening the gate.

50. In a machine of the character described, a casing, a weighing hopper therein adapted to be supported on the weighing scale, gate means operating to permit a relatively large stream of the material to flow to the hopper, gate mechanism for controlling the gate means, tripping mechanism controlled by the load in the hopper for actuating the gate mechanism to shut off the relatively large stream and permit the continued flow of a relatively small stream to the hopper, a second tripping mechanism controlled from the scale and operating to control the gate mechanism to shut off the relatively small stream when a predetermined weight has accumulated in the hopper, automatic means energized from a source independent of the hopper weights, for dumping the hopper, for resetting the tripthe combination of a weighing hopper, adapted to be supported on the weighing scale, a dumping bottom for the hopper, a dumping wheel rotatably supported on the hopper and connected with the dumping bottom to control the dumping of the bottom, detent means associated with the wheel to prevent the dumping bottom from dumping the load from the hopper, automatic means controlled by the movement of the hopper for actuating the detent means to permit the hopper bottom to dump the load, driving means for rotating the wheel to close the hopper bottom, and means cooperating with the dumping wheel for holding up the dumping wheel to maintain connection with the driving means and operating to permit disconnection from the driving means while the hopper is receiving the load.

40. In an automatic weighing machine, the combination of a weighing hopper adapted to be supported on the weighing scale, a dumping bottom for the hopper, a dumping gear wheel mounted on the hopper to rotate in a substantially vertical plane, a connection for the dumping gear wheel to the dumping bottom for controlling the dumping bottom, a driving gear wheel mounted to rotate in a substantially vertical plane, and about a fixed axis so as to mesh with the dumping gear wheel and rotate the same to close the hopper bottom, said dumping gear wheel having a gap in the teeth thereof located so as to lie adjacent to the driving gear wheel when the bottom is closed, detent means associated with the dumping gear wheel for preventing the rotation thereof, to hold the bottom closed, automatic means controlled by the movement of the hopper to release the same when the hopper has received a predetermined load, the said connection between the dumping gear wheel and the hopper bottom operating to permit the hopper bottom to be dumped.

41. An automatic weighing machine constructed as specified in claim 40, in combination with a disk rigid and concentric with the dumping gear wheel, a roller to engage the lower edge of the disk and hold the dumping gear wheel in mesh with the driving gear wheel when the driving gear wheel is actuating the dumping gear wheel to close the dumping bottom, said disk having a recess in its edge diametrically opposite to the gap in the teeth of the dumping gear wheel to permit the unobstructed descent of the hopper under the weight of the load in the hopper.

42. In an automatic weighing machine, the combination of a weighing hopper, adapted to be supported on the weighing scale, a dumping bottom for the hopper, a dumping gear wheel mounted on the hopper to rotate in a substantially vertical plane, a connecting rod for controlling the dumping bottom and having a pivotal connection with the dumping wheel, detent means associated with the dumping wheel for holding the same with the pivotal connection elevated and thereby holding the dumping bottom closed, automatic means for releasing the detent to permit the dumping bottom to be dumped by the weight of the load in the hopper, a part carried by the dumping wheel and a spring engaging the said part when the dumping wheel is in the position in which it is held by the detent means, said spring operating to initiate the rotation of the dumping wheel in the dumping movement.

43. In a machine of the character described, the combination of a gate, a weighing hopper, a detent wheel connected with the gate for opening the same, a pivoted arm carrying the detent wheel, tripping mechanism including a fixed detent above the detent wheel to engage the same and thereby hold the gate open, means controlled by the weight of the load in the hopper for actuating the tripping mechanism to permit the arm to drop and thereby to disengage the detent wheel from the fixed detent, and means for closing the gate after the disengagement of the detent wheel from the fixed detent.

44. In a machine of the character described, the combination of a gate, a weighing hopper, a detent wheel connected with the gate for opening the same, a pivoted arm carrying the detent wheel, tripping mechanism including a fixed detent above the detent wheel to engage the same and thereby hold the gate open, means controlled by the weight of the load in the hopper for actuating the tripping mechanism to permit the arm to drop and thereby disengage the detent wheel from the fixed detent, means for closing the gate after the disengagement of the detent wheel from the fixed detent, a dumping bottom for the hopper, dumping mechanism for controlling the dumping bottom, and means actuated by the dumping mechanism for resetting the tripping mechanism and for raising the detent wheel into engagement with the fixed detent.

45. In a machine of the character described, the combination of a gate, a weighing hopper, a detent wheel connected with the gate for opening the same, a pivoted arm carrying the detent wheel, tripping mechanism including a fixed detent above the detent wheel to engage the same and thereby hold the gate open, means controlled by the weight of the load in the hopper for actuating the tripping mechanism to permit the arm to drop and thereby disengage the detent wheel from the fixed detent, said hopper having a dumping botping mechanisms and for actuating the gate mechanism to open the gate means.

51. In an automatic weighing machine, the combination of a receiver for the material to be weighed, a weighing hopper adapted to be supported on the scale below the receiver, gate means operating to permit a relatively large stream to flow to the hopper, a beater within the receiver for delivering the relatively large stream at a high velocity to the hopper, automatic means for operating the gate means to shut off the relatively large stream, controlled by the load in the hopper, said gate means operating to permit a relatively small stream thereafter to flow to the hopper, a beater within the receiver to control the flow of the small stream, automatic means controlled by the scale for shutting off the flow of the small stream when a predetermined weight has accumulated in the hopper, automatic means for dumping the hopper, and automatic means for reopening the gate means to reload the hopper.

52. In an automatic weighing machine, the combination of a receiver for the material to be weighed having a bottom with a relatively large opening therein, and a small opening, a rotary beater opposite the large opening, means for driving the same at a relatively high velocity to accelerate the stream of material flowing through the large opening, a second rotary beater opposite the small opening, means for driving the same at a relatively low speed operating to maintain a stream of the material flowing through the relatively small opening, a hopper below the openings to receive the material and adapted to be supported on the scale, automatic means for closing the large opening and for subsequently closing the small opening, means for controlling the last named means by the load accumulated in the hopper, and automatic means for dumping the load from the hopper and for reopening the two openings.

53. In an automatic weighing machine, the combination of a weighing hopper adapted to be supported on the weighing scale, a gate for controlling the flow of material to the hopper, gate mechanism connected with the gate, tripping mechanism including detent means to prevent the closing of the gate and operating to release the gate mechanism when a predetermined load has accumulated in the hopper, means for closing the gate when the gate mechanism is released from the detent means, a dumping bottom for controlling the same, means actuated by the gate closing means for controlling the dumping mechanism to effect the dumping of the hopper, said tripping mechanism including a rock shaft, means actuated by the dumping mechanism for rotating the rock shaft to reset the tripping mechanism, power-driven means for reopening the gate after it has closed, and means actuated by the rock shaft for controlling the same.

54. In a machine of the character described, the combination of a receiver carrying a supply of the material to be weighed, a casing, a hopper below the receiver, a gate for controlling a stream of the material flowing to the hopper from the receiver, a dumping bottom for the hopper, dumping mechanism for the dumping bottom, detent means for preventing the operation of the dumping mechanism, tripping mechanism actuated by the hopper for effecting the closing of the gate, and automatic means controlled by the tripping mechanism and carried by the casing and the receiver, for actuating the detent means to permit the operation of the dumping mechanism.

55. In an automatic weighing machine, the combination of a hopper to receive the material to be weighed, a compartment for the material having a large feed opening and a small feed opening in its bottom, continuously driven feeding means within the compartment for moving the material toward the feed openings, mechanically driven means located over the large opening for accelerating a relatively large stream of the material through the large opening into the hopper, a main gate for the large feed opening, a small gate for the small feed opening, said gates being unconnected so as to operate independently of each other, automatic mechanism controlled by the hopper operating first, to actuate the main feed gate to close the large feed opening and secondly, operating to actuate the small gate to close the small feed opening when a predetermined weight has been received by the hopper.

56. In an automatic weighing machine, the combination of a hopper to receive the material to be weighed, a compartment for the material having a large feed opening and a small feed opening in its bottom, continuously driven feeding means within the compartment for moving the material toward the feed openings, mechanically driven means located over the large opening for accelerating a relatively large stream of the material through the large opening into the hopper, continuously driven mechanical feeding means for delivering a stream through the small opening, a main gate for the large opening, a small gate for the small opening, said gates being unconnected and constructed to operate independently of each other, automatic mechanism controlled by the hopper operating, first, to close the main gate and, secondly, to close the small gate when a predetermined weight has been received by the hopper.

In testimony whereof, I have hereunto set my hand.

WILLIAM WOOLCOTT.